W. H. CARRIER.
APPARATUS FOR REGULATING THE HUMIDITY AND TEMPERATURE OF AIR.
APPLICATION FILED JULY 30, 1913.
1,231,705. Patented July 3, 1917.
3 SHEETS—SHEET 1.
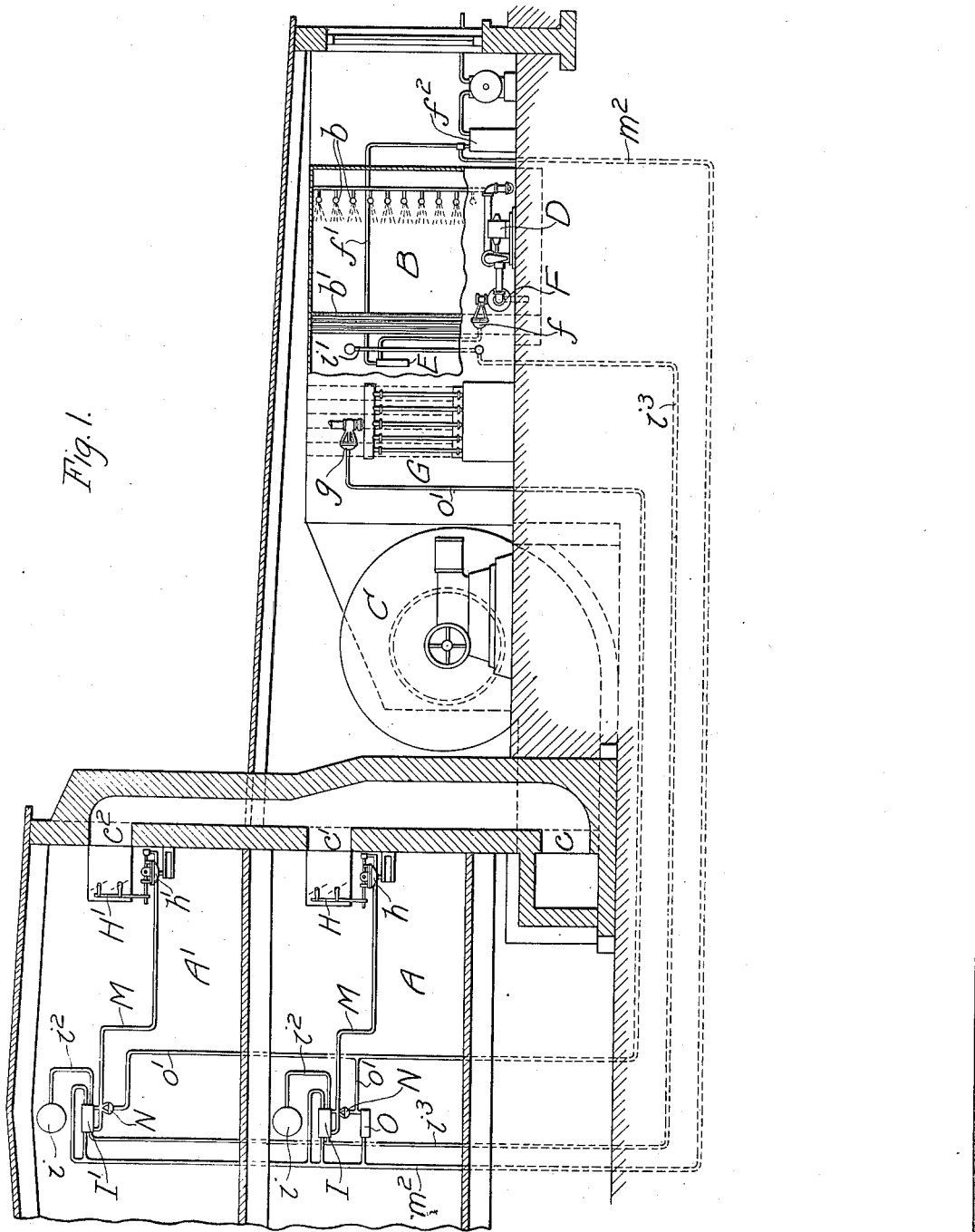

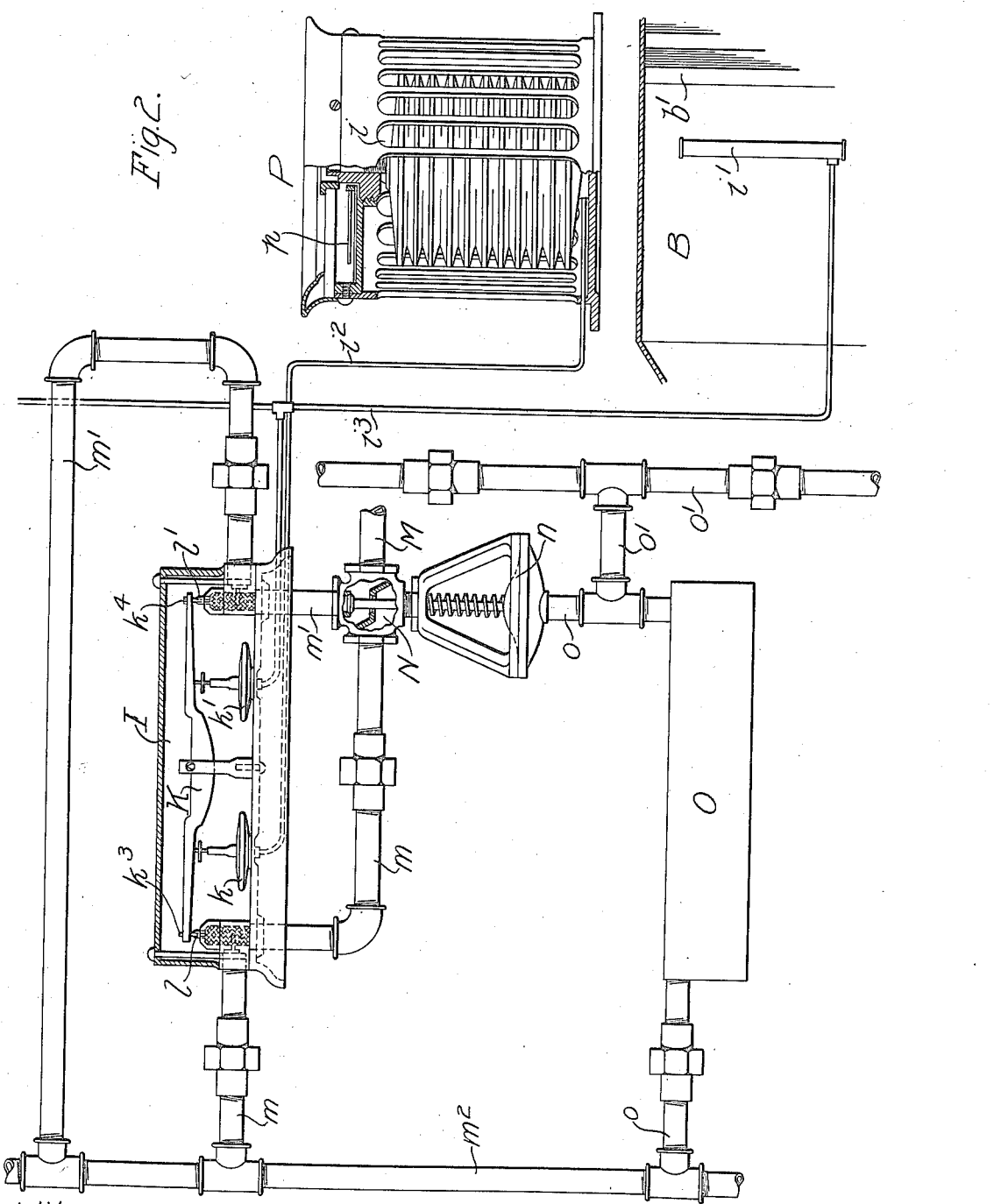

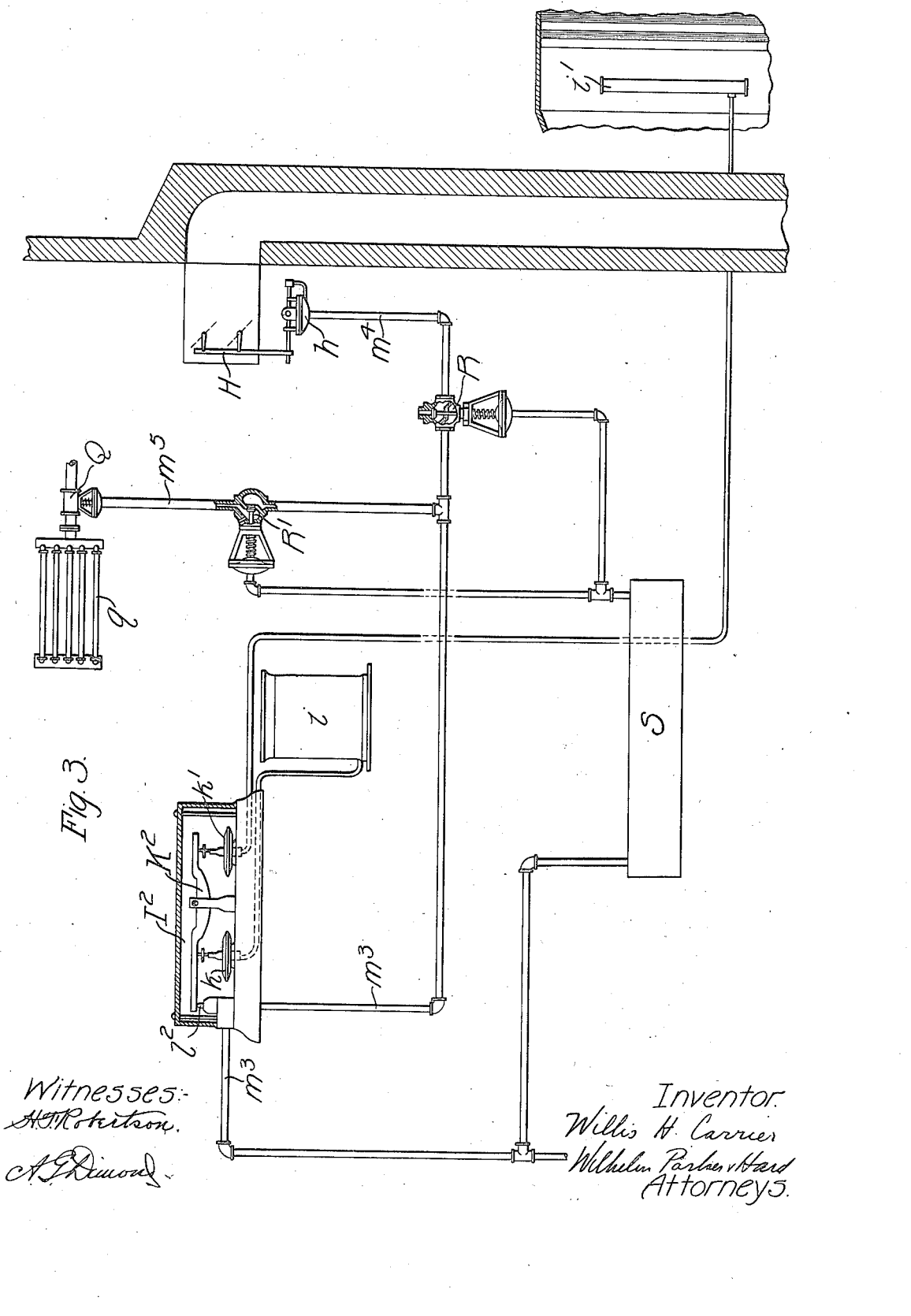

UNITED STATES PATENT OFFICE.

WILLIS H. CARRIER, OF BUFFALO, NEW YORK, ASSIGNOR TO BUFFALO FORGE COMPANY, OF BUFFALO, NEW YORK.

APPARATUS FOR REGULATING THE HUMIDITY AND TEMPERATURE OF AIR.

1,231,705. Specification of Letters Patent. Patented July 3, 1917.

Original application filed May 31, 1911, Serial No. 630,318. Divided and this application filed July 30, 1913. Serial No. 782,036.

*To all whom it may concern:*

Be it known that I, WILLIS H. CARRIER, a citizen of the United States, residing at Buffalo, in the county of Erie and State of New York, have invented a new and useful Improvement in Apparatus for Regulating the Humidity and Temperature of Air, of which the following is a specification.

This invention relates in particular to apparatus for regulating the humidity and temperature of air in one or more of the rooms of a building, whereby a definite percentage of humidity can be maintained in the room or inclosure, notwithstanding fluctuations in the room temperature, by regulating the room temperature with reference to the saturation temperature of humidified air which is supplied to the room, so as to maintain a predetermined difference between these temperatures depending upon the desired relative humidity in the room.

This application is a division of my application filed May 31, 1911, Serial No. 630,318, for a method for regulating the humidity and temperature of air.

According to the herein described system, the room is supplied with saturated air from which the free moisture has been eliminated, and the humidity of the air in the room is controlled, preferably by regulating the volume of the saturated air admitted to the room. This control is obtained through a differential thermostat which has two elements affected respectively by the room temperature and the saturation temperature at the humidifier, and controls volume dampers by which the quantity of saturated air supplied to the room is increased or decreased, so as to maintain the necessary difference between the room temperature and the saturation temperature at the humidifier to give the desired relative humidity.

Preferably the air is saturated at a desired fixed temperature, which is automatically maintained, whenever the outside wet bulb temperature is below said saturation temperature, but when the outside wet bulb temperature is above said desired mimimum saturation temperature the air is simply saturated at the lowest temperature possible without refrigeration, which is the true wet bulb temperature of the outside air. The air thus saturated is introduced into the room either at its saturation temperature or at some increased temperature, produced by heating the saturated air before admitting it to the room, when such heating is necessary to insure a sufficient room temperature and maintain the desired relative humidity. When the air is introduced into the room at or slightly above its saturation temperature it becomes a source of cooling and the relative humidity is increased by increasing the supply of air to reduce the temperature of the room, thus bringing it nearer to its dew point. Conversely, by decreasing the supply of air, the heat existing in the room, due to machinery, sunlight, or other sources, raises the temperature of the room, thus decreasing its relative humidity. On the contrary, when the previously saturated air supplied to the room is heated above the room temperature, the relative humidity is decreased by increasing the supply of air, which increases the difference between the dew point and the room temperature, and is increased by reducing the supply of air. This obviously permits an accurate regulation of the room conditions through the control of its temperature with respect to the dew point.

Suitable means are preferably provided whereby the action of the differential thermostat is reversed whenever the temperature of the saturated air is raised above the room temperature, thus permitting the same differential thermostat to control the temperature and relative humidity in the room, whether the saturated air admitted is below or above the room temperature.

In this system the control at the humidifier for saturating the air at a definite temperature is independent of the conditions in the room, but the temperature of the room is maintained at the required number of degrees above the saturation temperature to give the desired relative humidity, which can be done by regulating the volume of warm or cold conditioned air introduced into the room, in the manner described, or by the automatic variation of other source of heat or cold in the room.

In the accompanying drawings consisting of three sheets:

Figure 1 is a sectional elevation, partly diagrammatic, of an apparatus embodying the invention.

Fig. 2 is an elevation of the differential thermostat and associated parts.

Fig. 3 is a diagram of a modified apparatus.

Like reference characters refer to like parts in the several figures.

Referring first to Fig. 1, A, A' represent the rooms of a building to which saturated air is supplied from a humidifier B through suitable ducts or passages $c$, $c'$, $c^2$ by an air propelling fan or device C. The humidifier may be of any suitable sort adapted to produce perfect saturation of the air, for instance, it comprises a spray chamber through which the air is drawn by the fan and which is filled with a finely divided spray or mist of water by a group of suitable spray nozzles $b$, and is provided with an eliminator $b'$ adapted to remove the free moisture from the saturated air. The spray water is conveniently supplied to the spray nozzles by a pump D which takes the water from a collecting well in the bottom of the spray chamber, so that the same water is circulated and used repeatedly.

E represents a thermostat which regulates the temperature in the humidifier so as to saturate the air at a predetermined temperature. In the apparatus illustrated the water is heated by a steam injector F and the thermostat E is located in the humidifier and controls the steam supply valve $f$ of the injector by regulating the pressure in a pipe $f'$ by which compressed air for actuating the steam supply valve $f$ is conveyed thereto from a supply tank $f^2$. The thermostat E is adjusted to maintain the desired saturation temperature and operates automatically through the medium of the compressed air to control the action of the injector F to vary the temperature of the spray water as required for this purpose. The thermostat operates thus only when the wet bulb temperature of the outside air is below the desired saturation temperature. When the outside wet bulb temperature rises above the desired saturation temperature the air is saturated at the lowest temperature possible without refrigeration.

G represents a heater of any suitable sort for heating the saturated air before admitting it to the room, when this is necessary in order to obtain a sufficient room temperature. The temperature to which this heater raises the air is regulated by a steam supply valve $g$ under the control of a thermostat as hereinafter explained.

H, H' represent dampers controlling the ducts $c'$ $c^2$ which supply the saturated air to the rooms. The damper H for the room A is actuated by a pressure-operated diaphragm or motor $h$ under the control of a differential thermostatic regulator I and the damper H' for the other room is similarly operated by a diaphragm or motor $h'$ under the control of a differential thermostatic regulator I'. The thermostatic regulator for each room has a thermal element which is influenced by the room temperature and another thermal element which is influenced by the saturation temperature at the humidifier.

These air dampers and the thermostatic controlling means therefor can be of any construction capable of effecting the herein described regulation, the devices shown and described herein being selected merely as illustrative of the invention.

In the apparatus shown in the drawings the thermostatic regulator for each room has an element $i$, containing expansible fluid, which is located in the room so as to be influenced by the temperature thereof, and an element $i'$, also containing expansible fluid, which is located in the humidifier where it is influenced by the temperature of the saturated air after it passes the eliminator. A single element $i'$ in the humidifier, common to all of the thermostats, is sufficient and only one is used. The elements $i$ and $i'$ are connected by pipes $i^2$ and $i^3$ respectively to two diaphragms or motors $k$ and $k'$ which act in opposition to each other on a regulating lever K at opposite sides of the fulcrum thereof. The expansion and pressure of the fluid in the elements $i$ and $i'$ vary with changes in the temperatures affecting the elements and the regulating lever K is held stationary or moved in one direction or the other depending upon the relative fluid pressures in the diaphragms $k$ $k'$. The lever K carries valves $k^3$ $k^4$ at its opposite ends which control bleeder or escape ports $l$ and $l'$ in two branches $m$ $m'$ of a pipe M connecting the operating motor $h$ for the damper H with a supply pipe $m^2$ leading from the compressed air tank $f^2$.

N represents a reversing valve which in the position shown in Fig. 2 closes the branch pipe $m'$ so that the compressed air for operating the damper H then passes through the branch pipe $m$ and is controlled by the lever K coöperating with the escape port $l$. When the valve N is shifted to its other position, it closes the branch pipe $m$ so that then the air for operating the damper H passes through the other branch pipe $m'$ and is regulated by the lever K coöperating with the other escape port $l'$. A thermostat O of any suitable kind, which is influenced by the room temperature, controls the reversing valve, for instance by regulating the pressure of air in a pipe $o$ connecting the valve-actuating diaphragm $n$ with the compressed air supply pipe $m^2$. This thermostat also regulates the air pressure in a pipe $o'$ leading to the pressure operated steam valve $g$ of the air heater G, for turning on and shutting off this heater.

One of the elements of the differential thermostat, preferably the element $i$ that is located in the room, is adapted to be distended and collapsed for changing its capacity. By adjusting this element $i$ by a screw P the thermostat can be set to maintain different desired relative humidities, which are indicated by a suitably calibrated scale with which a pointer $p$ attached to the screw cooperates.

The operation of the thermostatic regulating device is as follows, assuming the reversing valve N to be in the position shown in Fig. 2, the heater G shut off, so that the humidified air is delivered to the room at or slightly above its saturation temperature, and the thermal element $i$ adjusted to maintain the required difference between the temperature of the room and the saturation temperature of the humidified air to give the desired relative humidity. So long as this difference is maintained the position of the regulating lever K and the air damper H will remain unchanged, regardless of whether or not the temperatures of the room and of the humidfied air fluctuate. If the difference in the temperatures is increased, which results in reducing the relative humidity, the consequent relatively greater pressure in the diaphragm $k$ will cause the lever K to open the escape port $l$ more or less. This will reduce the air pressure in the pipe M and operating diaphragm of the damper H, thereby causing the damper to open and admit more humidified air to the room. Since the air has a cooling effect this results in increasing the relative humidity. An increase in the relative humidity above that for which the device is set will produce an opposite movement of the regulating lever and air damper H so as to admit less air and decrease the relative humidity. Whenever the room temperature falls below the predetermined minimum degree for which the thermostat O is set, the thermostat will operate to turn on the heater G and shift the reversing valve N so that the regulating lever K will then coöperate with the escape port $l'$, instead of the port $l$, in controlling the air damper H. As the escape ports $l$ and $l'$ are located at opposite sides of the fulcrum of the lever, the same action of the regulating device, which before caused a reduction in the supply of humidified air to the room, will now cause an increase in the supply of heated humidified air, and, therefore, produce the opposite effect on the relative humidity. When the room temperature is restored to the desired predetermined degree the thermostat O will again reverse the action of the regulator and shut off the heater G. Thus the one differential thermostatic regulator operates to properly regulate the temperature and relative humidity, whether the air admitted is below or above the room temperature.

The regulating device for the room A', or for each of the other rooms, in case more than two rooms are equipped with the regulating means, operates to control the air admission damper H' and is connected to thermostatic elements $i$ and $i'$, to the damper actuating diaphragm $h'$ and to the compressed air supply in the same manner as the regulator I described, the corresponding parts of the two regulating devices being designated by the same reference characters. The reversing valve N of the regulator I' is, however, connected to and operated by the thermostat O, instead of by a separate thermostat located in the room A'.

Fig. 3 illustrates an application of the apparatus in which the humidified air is not heated and the regulation of the room temperature with reference to the saturation temperature is effected by controlling a heater in the room and the volume of saturated air admitted to the room.

In this arrangement the differential thermostatic regulator I² has elements $i$ and $i'$ arranged and operating diaphragms $k$ $k'$ just as before, but the regulating lever K² only controls one escape port $l^2$ in a compressed air supply pipe $m^3$. This pipe has a branch $m^4$ leading to the operating diaphragm $h$ for the damper H and a branch $m^5$ leading to the actuating diaphragm of the steam valve Q of a radiator or heater $q$, located in the room. The branch pipes $m^4$ and $m^5$ are provided with pressure operated valves R and R', respectively, which are controlled by a thermostat S located in the room.

In this apparatus the differential regulator I² controls the quantity of saturated air admitted to the room, and also controls the heater $q$ to regulate the room temperature. Assuming that the valve Q is open to admit steam to the heater $q$ and that the damper H is normally open, if a predetermined maximum room temperature is reached the therostat S will operate to admit compressed air to the diaphragms of the valves R and R', which will operate the latter to cut off the compressed air from the heater valve Q, permitting this valve to close and open communication between the damper actuating diaphragm $h$ and the regulator I². The differential thermostat I² will then control the humidity and room temperature by regulating the volume of the saturated air admitted to the room in the manner explained in connection with the first apparatus. When the room temperature falls to a predetermined degree, the thermostat S will act to reverse the position of the valves R and R', thereby cutting off the compressed air from the damper diaphragm $h$ and admitting it to the diaphragm of the heater valve Q. The heater is thus turned on and will raise the temperature of the room until the required temperature is restored, when the thermostat S will operate as before to shift the control to the air damper H.

I claim as my invention:

1. The combination of means for saturating air with moisture, means for supplying the humidified air to an inclosure, and thermostatically controlled means which automatically regulate the temperature in said inclosure, so as to maintain a substantially constant difference between the temperature in the inclosure and said saturation temperature, substantially as set forth.

2. The combination of means for saturating air with moisture, means for supplying the humidified air to an inclosure, and thermostatic means controlled by the temperature in said inclosure and the saturation temperature of said humidified air and means controlled thereby, which automatically regulate the temperature in said inclosure, so as to maintain a substantially constant difference between the temperature in the inclosure and said saturation temperature, substantially as set forth.

3. The combination of means for saturating air with moisture, means for supplying the humidified air to an inclosure, means for regulating the quantity of said humidified air admitted to the inclosure, and thermostatic means for controlling said regulating means comprising thermal elements respectively influenced by the temperature in said inclosure and the saturation temperature of said humidified air, and a regulating device whose action is dependent upon the relative action of said thermal elements, substantially as set forth.

4. The combination of means for saturating air with moisture, means for supplying the humidified air to an inclosure, means for regulating the quantity of said humidified air admitted to the inclosure, differential thermostatic means controlled jointly by the temperature in said inclosure and the saturation temperature of said humidified air which automatically control said regulating means, a heater for the humidified air adapted to raise the temperature of the same above that of the air in the inclosure, and a thermostat influenced by the temperature in the inclosure which controls said heater and reverses the action of said differential thermostatic means whenever the heater is set in operation, substantially as set forth.

5. The combination of means for saturating air with moisture, means for supplying the humidified air to an inclosure, a damper, means for actuating said damper to regulate the quantity of said humidified air admitted to the inclosure, a differential thermostat which has thermal elements influenced respectively by the temperature in said inclosure and the saturation temperature of said humidified air and controls said damper-actuating means to maintain a substantially constant difference between the temperature in said inclosure and the saturation temperature of said humidified air, a heater adapted to raise the temperature of the humidified air above that of the air in the inclosure, and a thermostatic device which reverses the action of said differential thermostat whenever the heater is set in operation, substantially as set forth.

6. The combination of means for saturating air with moisture, means for supplying the humidified air to an inclosure, and thermostatic means controlled by the temperature in said inclosure and the saturation temperature of said humidified air and means controlled thereby, which automatically regulate the quantity of said humidified air admitted to the inclosure and thereby control the temperature in the inclosure to maintain a substantially constant difference between the temperature in the inclosure and said saturation temperature, substantially as set forth.

7. The combination of means for saturating air with moisture, means for supplying the humidified air to an inclosure, and thermostatically controlled means which regulate the quantity of said humidified air admitted to the inclosure and thereby maintain a predetermined difference between the temperature in the inclosure and the saturation temperature of said humidified air, substantially as set forth.

8. The combination of means for saturating air with moisture, means for supplying the humidified air to an inclosure, and means responsive to the relation between the temperature of said inclosure and the saturation temperature of said humidified air for regulating the quantity of said humidified air admitted to the inclosure, so as to maintain a predetermined difference between said temperatures, substantially as set forth.

9. The combination of means for saturating air with moisture, means for supplying the humidified air to an inclosure, and means for regulating the quantity of said humidified air admitted to the inclosure and thereby maintaining a predetermined difference between the temperature in the inclosure and the saturation temperature of said humidified air, substantially as set forth.

10. The combination of means for saturating air with moisture, means for supplying the humidified air to an inclosure, means for regulating the quantity of said humidified air admitted to the inclosure, a heater for the humidified air, and means responsive to changes of temperature in the inclosure for altering the action of said heater and reversing the action of said regulating means when the temperature of said humidified air bears a predetermined relation to the temperature of the inclosure, substantially as set forth.

11. The combination of means for saturating air with moisture, means for supplying the humidified air to an inclosure, thermoresponsive means jointly controlled by the temperature in the inclosure and the saturation temperature of the humidified air, and means controlled thereby for normally regulating the quantity of the humidified air admitted to the inclosure to maintain a predetermined difference between the temperature in the inclosure and the saturation temperature of the humidified air, heating means adapted to raise the temperature in the inclosure, and means responsive to changes of temperature in the inclosure which operate at a predetermined temperature to alter the action of said heating means and to change the normal action of said regulating means.

12. The combination of means for saturating air with moisture, means for supplying the humidified air to an inclosure, thermoresponsive elements influenced respectively by the temperature in the inclosure and the saturation temperature of the humidified air, and means controlled thereby for normally regulating the quantity of the humidified air admitted to the inclosure to maintain a predetermined difference between the temperature in the inclosure and the saturation temperature of the humidified air, heating means adapted to raise the temperature in the inclosure, a thermostat affected by the temperature in the inclosure, and means controlled thereby which operate at a predetermined temperature to cause the heating means to supply heat to the inclosure and to change the normal action of said regulating means.

13. The combination of a humidifier for saturating air with moisture, means for supplying the himidified air to an inclosure, means for regulating the quantity of said humidified air admitted to the inclosure for maintaining a predetermined relation between the temperature in the inclosure and the saturation temperature of said humidified air, a heater for the humidified air, and means which throw said heater into and out of action and reverse the action of said regulating means when the temperature of the inclosure falls below or rises above a predetermined temperature, substantially as set forth.

14. The combination of a humidifier for saturating air with moisture, means for supplying the humidified air to an inclosure, means for regulating the temperature in the humidifier to maintain a substantially fixed saturation temperature therein when the outside wet bulb temperature is below said saturation temperature, and means for maintaining a predetermined difference between the temperature in said inclosure and said saturation temperature in the humidifier, substantially as set forth.

15. The combination of a humidifier for saturating air with moisture, means for supplying the humidified air to an inclosure, means for regulating the temperature in the humidifier to maintain a substantially fixed saturation temperature therein when the outside wet bulb temperature is below said saturation temperature, and means for regulating the temperature in said inclosure to maintain a predetermined difference between said temperature and said saturation temperature in the humidifier, substantially as set forth.

16. The combination of a humidifier for saturating air with moisture, means for supplying the humidified air to an inclosure, means for regulating the temperature in the humidifier to maintain a substantially fixed saturation temperature therein when the outside wet bulb temperature is below said saturation temperature, and means for regulating the quantity of said humidified air admitted to the inclosure to maintain a predetermined difference between the temperature in the inclosure and said saturation temperature in the humidifier, substantially as set forth.

17. The combination of a humidifier for saturating air with moisture, means for supplying the humidified air to an inclosure, means for regulating the temperature in the humidifier to maintain a substantially fixed saturation temperature therein when the outside wet bulb temperature is below said saturation temperature, means controlled by the temperature in the inclosure and said saturation temperature in the humidifier for regulating the quantity of said humidified air admitted to the inclosure, a heater for the humidified air adapted to raise the temperature of the same above that of the air in the inclosure, and means responsive to changes in the temperature in the inclosure which controls said heater and reverse the action of said regulating means when the heater is set in action, substantially as set forth.

Witness my hand, this 26th day of July, 1913.

WILLIS H. CARRIER.

Witnesses:
  H. C. RICE,
  CARLOS CELERIAN.